United States Patent

Guettes et al.

[11] Patent Number: 6,100,308
[45] Date of Patent: Aug. 8, 2000

[54] PREPARATION OF POLYURETHANES HAVING IMPROVED CURING

[75] Inventors: Bernd Guettes, Sallgast; Stefan Dinsch, Schipkau; Gottfried Knorr, Schwarzheide; Holger Seifert, Hüde, all of Germany

[73] Assignee: BASF Aktiengesellschaft, Ludwigshafen, Germany

[21] Appl. No.: 08/900,497

[22] Filed: Jul. 25, 1997

[30] Foreign Application Priority Data

Jul. 31, 1996 [DE] Germany .................. 196 30 787

[51] Int. Cl.⁷ .................................................. C08G 18/48
[52] U.S. Cl. ............................... 521/131; 521/167
[58] Field of Search .................. 528/78; 521/164, 521/131

[56] References Cited

U.S. PATENT DOCUMENTS

| | | | |
|---|---|---|---|
| 4,562,290 | 12/1985 | Korczak et al. | 564/399 |
| 4,792,624 | 12/1988 | Hatfield et al. | 564/333 |
| 4,980,416 | 12/1990 | Awaji | 525/112 |
| 5,246,978 | 9/1993 | Ozaki et al. | 521/164 |

*Primary Examiner*—Rachel Gorr
*Attorney, Agent, or Firm*—Fernando A. Borrego

[57] ABSTRACT

Polyurethanes having improved curing are prepared by reacting a) organic and/or modified organic diisocyanates and/or polyisocyanates with b) polyether polyols based on aromatic amines, able to be prepared by reacting specific amine combinations and, if desired, further coinitiators in a stage wise molecular addition of alkylene oxide, and also, if desired, further relatively high molecular weight compounds containing at least two reactive hydrogen atoms and, if desired, c) low molecular weight chain extenders and/or crosslinkers in the presence of d) blowing agents, e) catalysts and, if desired, f) further auxiliaries and/or additives, wherein the specific amine combination used is a mixture of amines of the diphenylmethane series consisting of from 5 to 20% by weight of 4-ring amine, from 15 to 30% by weight of 3-ring amine, from 20 to 35% by weight of amines having more than 4 rings and from 25 to 50% by weight of 2-ring amine, wherein the proportions add up to 100% by weight, in combination with further aromatic amines.

17 Claims, No Drawings

006,100,308

PREPARATION OF POLYURETHANES HAVING IMPROVED CURING

The present invention relates to a process for preparing polyurethanes having improved curing by reacting organic and/or modified organic diisocyanates and/or polyisocyanates with polyether polyols based on aromatic amines, able to be prepared by reacting specific amine combinations and, if desired, further coinitiators in a step-wise molecular addition of alkylene oxide, and also, if desired, further relatively high molecular weight compounds containing at least two reactive hydrogen atoms and further customary auxiliaries and/or additives.

The preparation of polyurethanes by reacting NCO-containing compounds, in particular organic polyisocyanates and/or modified organic polyisocyanates or prepolymers based on organic isocyanates with higher-functional compounds containing at least two reactive hydrogen atoms, for example polyoxyalkylene-polyamines, and/or preferably organic polyhydroxyl compounds has been described many times. Depending on the intended field of application of the finished polyurethanes, the polyhydroxyl compounds used are preferably polyetherols and/or polyesterols of differing composition and having different molecular weights and these are reacted with the isocyanates together with the customary additives such as chain extenders and/or crosslinkers, catalysts, blowing agents and further auxiliaries to give polyurethanes. A summary overview of the preparation of polyurethanes is given, for example, in Kunststoff-Handbuch, Vol. VII, "Polyurethane", 1st edition 1966, edited by Dr R. Vieweg and Dr A. Hochtlen, and 2nd. edition, 1983, and also 3rd edition, 1993, edited by Dr. G. Oertel, (Carl Hanser Verlag, Munich).

Polyol components used for, in particular, rigid polyurethane foams are polyetherols based on high-functionality alcohols, sugar alcohols and/or saccharides. Apart from these polyetherols which improve the crosslinking in the polyurethane matrix, amine polyetherols based on aliphatic amines such as ethylenediamine, diethylenetriamine or triethylenetetramine, as described in DD-B-235 878, are used to improve the curing. Disadvantages of the use of aliphatic amine polyetherols are the restricted applicability to only certain types of rigid foams because of the sometimes poor miscibility in the system components and unsatisfactory effects in respect of the thermal stability.

For this reason, particularly for insulating foams in which improvement of the cell structures (smaller cells) is sought, aromatic amine polyetherols based on aromatic amines such as aniline, methylenedianiline, tolylenediamine and polyamines or polyamine mixtures formed by acid aniline/formaldehyde condensation are increasingly used and these are reacted on their own or in admixture with coinitiators such as further amines, aminoalcohols or alcohols or even polyether alcohols with lower alkylene oxides. The process described, for example, in DD-A-232 714 for preparing amine polyetherols using specific waste aniline mixtures has the disadvantage of unsatisfactory reproducibility of the polyetherol properties and is therefore extremely restricted in its use and is unsuitable for the production of high-quality rigid foams. Customary methods are also described in U.S. Pat. No. 3 159 591 or DE-A-15 69 497. Polyetherols based on polyamine mixtures of the MDA series together with higher-functional polyols are reacted to give polyurethane foams. A problem in these applications is the varying content of free amino groups. These fluctuations in composition cause difficulties in the catalysis, curing and crosslinking of the polyurethane foams. A further disadvantage is the high viscosity of the polyetherols and the resulting poor mechanical processibility.

It is an object of the present invention to provide a process for preparing polyurethanes, in particular rigid polyurethane foams, having improved curing which are based on organic, in particular aromatic, isocyanates and are prepared using OH-functional aromatic amine polyether polyols while avoiding free amino groups, which process ensures a molecular weight or chain length distribution optimum for use in polyurethanes at low viscosities.

We have found that this object is achieved by, in the preparation of the polyurethanes, using polyether polyols based on aromatic amines, able to be prepared by reacting specific amine combinations and, if desired, further coinitiators in a step-wise molecular addition of alkylene oxide, and also, if desired, further relatively high molecular weight compounds containing at least two reactive hydrogen atoms, where the specific amine combination is a mixture of amines of the diphenylmethane series in combination with further aromatic amines.

The present invention accordingly provides a process for preparing polyurethanes having improved curing by reacting a) organic and/or modified organic diisocyanates and/or polyisocyanates with b) polyether polyols based on aromatic amines, able to be prepared by reacting specific amine combinations and, if desired, further coinitiators in a step-wise molecular addition of alkylene oxide, and also, if desired, further relatively high molecular weight compounds containing at least two reactive hydrogen atoms and, if desired, c) low molecular weight chain extenders and/or crosslinkers in the presence of d) blowing agents, e) catalysts and, if desired, f) further auxiliaries and/or additives, wherein the specific amine combination used is a mixture of amines of the diphenylmethane series consisting of from 5 to 20% by weight of 4-ring amine, from 15 to 30% by weight of 3-ring amine, from 20 to 35% by weight of amines having more than 4 rings and from 25 to 50% by weight of 2-ring amine, wherein the proportions add up to 100% by weight, in combination with further aromatic amines.

The present invention further provides for the use of these polyurethanes as insulation material in the building sector and the refrigeration appliance sector.

Amine combinations which have been found to be particularly useful for preparing the polyether polyols to be used are those comprising, according to the present invention, a mixture of amines of the diphenylmethane series which consists of from 5 to 15% by weight of 4-ring amine, from 15 to 25% by weight of 3-ring amine, from 20 to 30% by weight of amines having more than 4 rings and from 40 to 50% by weight of 2-ring amine, where the proportions add up to 100% by weight.

As further aromatic amines which are used in combination with the mixture of amines of the diphenylmethane series, preference is given to aniline, aminobenzylaniline, toluidine and/or tolylenediamine. However, derivatives of the aromatic amines mentioned, in particular alkoxylation products of, for example, aniline, tolylenediamine and/or amines of the diphenylmethane series, can also be used.

The further aromatic amines are used in an amount of from 0.01 to 20% by weight, preferably in an amount of from 0.1 to 10% by weight, based on the weight of the mixture of amines of the diphenylmethane series used.

The specific amine combinations are, in the presence or absence of further coinitiators, reacted in a step-wise base-catalyzed molecular addition of alkylene oxide to give polyether polyols.

Coinitiators used are usually OH-functional compounds and/or aliphatic amine compounds in a proportion of less than 70% by weight, for example dihydric, trihydric and higher-functional alcohols, sugar alcohols, saccharides and/or ammonia or alkanol-amines prepared therefrom, ethylenediamine, diethylenetriamine, triethylenetetramine and alkoxylation products of these coinitiators and also mixtures of these compounds, but also further aromatic amines, their mixtures with aliphatic amines and/or hydroxyl-containing compounds, their alkoxylates, and/or mixtures of alkoxylates. Preference is given to hydroxyl-bearing compounds such as glycols, triols and higher-functional compounds, for example pentaerythritol, sorbitol and sucrose, and also alkoxylates derived from them and mixtures of these compounds.

Suitable alkylene oxides are in particular ethylene oxide and/or propylene oxide, but also butylene oxide, tetrahydrofuran and/or styrene oxide.

Cataylsts used for the base-catalyzed molecular addition of alkylene oxide are the compounds customarily used for this purpose, in particular alkali metal and alkaline earth metal hydroxides, perferably KOH and NaOH, or tertiary amines.

The composition of the mixture of specific amine combination and coinitiators to be used is matched to the type and amount of the alkylene oxides used. In this way, variation of the function alities and the molecular weights can be balanced with the viscosity. The optimization of the ratios of the individual alkylene oxides likewise contributes to a possible minimization of the viscosity.

The molecular addition of the alkylene oxides, in particular of ethylene oxide and/or propylene oxide, can be as an individual alkylene oxide, in blocks or as a random alkylene oxide mixture. Using the molecular weight required as a starting point, a polyol having high proportions of secondary OH groups is generally synthesized.

According to the present invention, the molecular addition of alkylene oxide is carried out in two or more stages, particularly preferably using increasing amounts of catalyst in each stage. The first stage is preferably carried out without catalyst or using small amounts of catalyst of less than 0.05% by weight and the following stages are carried out using amounts of catalyst of from 0.05 to 0.5% by weight, in each case calculated as KOH in the finished polyether.

Starting with the initiator mixture initially charged, amounts of catalyst of from 0 to 0.05% by weight are added in order to allow, in particular, the selective alkoxylation on the nitrogen of the amino groups to proceed. As the chains grow and OH groups are virtually exclusively formed, amounts of catalyst of from 0.05 to 0.5% by weight are used for the second and any further stages.

The first stage is preferably carried out using ethylene oxide, propylene oxide, or ethylene oxide/propylene oxide mixtures, while in the further stages primarily propylene oxide, ethylene oxide/propylene oxide mixtures or butylene oxide, or mixtures thereof, are metered in in order to obtain high concentrations of secondary OH groups corresponding to the desired molecular weights.

In the first stage, alkylene oxide equivalents in a ratio of from 0.5 to 2, preferably from 0.8 to 1.5, based on the mean functionality of the initiator mixture, are usually added.

In a preferred embodiment, the procedure is to react the total initiator mixture or a part of the initiator mixture comprising the specific amine combination and, if desired, coinitiator without catalyst or using a small amount of catalytic substances of <0.5% by weight, calculated as KOH in the finished polyether, with a partial amount of alkylene oxide in a first stage. Volatile constituents are then removed if appropriate. The remaining part of the initiator mixture is subsequently added. This prepolymer mixture is then admixed with catalytic substances in customary concentrations, in particular from 0.05 to 0.5% by weight, calculated as KOH in the finished polyether, and reacted with further amounts of alkylene oxide under the customary conditions of anionic alkylene oxide polymerization, in particular at from 80° C. to 130° C. and pressures of from 0.1 to 1.0 MPa, until the molecular weights necessary for the application are reached. This step-wise reaction can also be carried out in three or more stages using increasing amounts of catalyst in each stage.

After the polyetherol synthesis is complete, the catalyst is usually removed by acid neutralization, distillation under reduced pressure and filtration.

The mixtures of OH-functional amine polyether alcohols prepared in this way are, if desired in combination with further relatively high molecular weight compounds containing at least two reactive hydrogen atoms, reacted with the further components to give polyurethanes, in particular rigid polyurethane foams.

The preparation of the polyurethanes by the process of the present invention is carried out using the formative components known per se, with the exception of the mixtures of OH-functional amine polyether alcohols prepared according to the present invention. The following details may be given about these formative components.

a) Suitable organic and/or modified organic diisocyanates and/or polyisocyanates (a) are the aliphatic, cycloaliphatic, araliphatic, preferably aromatic polyfunctional isocyanates known per se.

Specific examples are: alkylene diisocyanates having from 4 to 12 carbon atoms in the alkylene radical, for example dodecane 1,12-diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate; cycloaliphatic diisocyanates such as cyclohexane 1,3- and 1,4-diisocyanate and also any mixtures of these isomers, 1-isocyanato-3,3,5-trimethyl-5-isocyanato-methylcyclohexane (IPDI), hexahydrotolylene 2,4- and 2,6-diisocyanate and also the corresponding isomer mixtures, dicyclohexylmethane 4,4'-, 2,2'- and 2,4'-diisocyanate and also the corresponding isomer mixtures, and preferably aromatic diisocyanates and polyisocyanates such as tolylene 2,4- and 2,6-diisocyanate and the corresponding isomer mixtures, diphenylmethane 4,4'-, 2,4'- and 2,2'-diisocyanate and the corresponding isomer mixtures, mixtures of diphenylmethane 4,4'- and 2,2,1'-diisocyanates, poly-phenylpolymethylene polyisocyanates, mixtures of diphenylmethane 2,4'-, 2,4'- and 2,2'-diisocyanates and polyphenylpolymethylene polyisocyanates (raw MDI) and mixtures of raw MDI and tolylene diisocyanates. The organic diisocyanates and polyisocyanates can be used individually or in the form of their mixtures.

Use is frequently also made of modified polyfunctional isocyanates, i.e. products which are obtained by chemical reaction of organic diisocyanates and/or polyisocyanates. Examples which may be mentioned are diisocyanates and/or polyisocyanates containing ester, urea, biuret, allophanate, carbodiimide, isocyanurate, uretdione and/or urethane groups. Specific examples of modified isocyanates are: organic, preferably aromatic polyisocyanates containing urethane groups and having NCO contents of from 33.6 to 15% by weight, preferably from 31 to 21% by weight, based on the total weight, for example diphenylmethane 4,4'-diisocyanate modified with low molecular weight diols, triols, dialkylene glycols, trialkylene glycols, or polyoxyalkylene glycols having molecular weights of up to 6000, in particular molecular weights of up to 1500, modified diphenylmethane 4,42'- and 2,42'-diisocyanate mixtures, modified raw MDI or tolylene 2,4- or 2,6-diisocyanate, with examples of dialkylene or polyalkylene glycols, which can be used individually or as mixtures, being: diethylene glycol, dipropylene glycol, polyoxyethylene, polyoxypropylene and polyoxypropylene-polyoxyethene glycols, triols and/or tetrols. Also suitable are prepolymers containing NCO groups, having NCO contents of from 25 to 3.5% by weight, preferably from 21 to 14% by weight, based on the total weight, and prepared from the polyester polyols and/or preferably polyether polyols described below and diphenylmethane 4,4'-diisocyanate, mixtures of diphenylmethane 2,4'- and 4,4'-diisocyanate, tolylene 2,4- and/or 2,6-diisocyanates or raw MDI. Other modified isocyanates which have been found to be useful are liquid polyisocyanates containing carbodiimide groups and/or isocyanurate rings and having NCO contents of from 33.6 to 15% by weight, preferably from 31 to 21% by weight, based on the total weight, for example those based on diphenylmethane 4,4'-, 2,4'- and/or 2,2'-diisocyanate and/or tolylene 2,4- and/or 2,6-diisocyanate.

If desired, the modified polyisocyanates can be mixed with one another or with unmodified organic polyisocyanates such as diphenylmethane 2,4'- and/or 4,4'-diisocyanate, raw MDI, tolylene 2,4- and/or 2,6-diisocyanate.

Organic polyisocyanates which have been found to be particularly useful and are therefore preferably used are: mixtures of tolylene diisocyanates and raw MDI or mixtures of modified organic polyisocyanates containing urethane groups and having an NCO content of from 33.6 to 15% by weight, in particular those based on tolylene diisocyanates, diphenylmethane 4,4'-diisocyanate, diphenylmethane diisocyanate isomer mixtures or raw MDI and in particular raw MDI having a diphenylmethane diisocyanate isomer content of from to 80% by weight, preferably from 30 to 60% by weight, in particular from 30 to 55% by weight.

As polyether polyols based on aromatic amines to be used according to the present invention, preference is given to using those which are able to be prepared by reaction of specific amine combinations and, if desired, further coinitiators in a step-wise molecular addition of alkylene oxide, as described above. In addition, further relatively high molecular weight compounds containing at least two reactive hydrogen atoms can be concomitantly used in an amount of up to 70% by weight, preferably from 20 to 50% by weight, based on the weight of the component (b).

The further relatively high molecular weight compounds containing at least two reactive hydrogen atoms which are used are advantageously those having a functionality of from 2 to 8, preferably from 2 to 6, and a molecular weight of from 300 to 8000, preferably from 300 to 3000. The compounds used depend on the desired properties of the polyurethane to be prepared. For example, polyetherpolyamines and/or preferably polyols selected from the group consisting of polyether polyols, polyester polyols, polythioether polyols, polyesteramides, hydroxyl-containing polyacetals and hydroxyl-containing aliphatic polycarbonates or mixtures of at least two of the polyols mentioned have been found to be useful. Preference is given to using polyester polyols and/or polyether polyols. The hydroxyl number of the polyhydroxyl compounds is generally from 150 to 850 mg KOH/g, and preferably from 200 to 600 mg KOH/g.

Polyols which are particularly preferably used are polyether polyols which can be prepared by known methods, for example from one or more alkylene oxides having from 2 to 4 carbon atoms in the alkylene radical by anionic polymerization using alkali metal hydroxides such as sodium or potassium hydroxide or alkali metal alkoxides such as sodium methoxide, sodium or potassium ethoxide or potassium isopropoxide as catalysts with addition of at least one initiator molecule containing from 2 to 8, preferably from 2 to 6, reactive hydrogen atoms in bonded form, or by cationic polymerization using Lewis acids such as antimony pentachloride, boron fluoride etherate, etc., or bleaching earth as catalyst.

Suitable alkylene oxides are, for example, tetrahydrofuran, 1,3-propylene oxide, 1,2- or 2,3-butylene oxide, styrene oxide and preferably ethylene oxide and 1,2-propylene oxide. The alkylene oxides can be used individually, alternately in succession or as mixtures. Examples of suitable initiator molecules are: water, organic dicarboxylic acids such as succinic acid, adipic acid, phthalic acid and terephthalic acid, aliphatic and aromatic, unalkylated or N-monoalkyated, N,N- and N,N'-dialkylated diamines having from 1 to 4 carbon atoms in the alkyl radical, for example unalkylated, monoalkylated and dialkylated ethylenediamine, diethylene-triamine, triethylenetetramine 1,3-propylenediamine, 1,3- or 1,4-butylenediamine, 1,2-, 1,3-, 1,4-, 1,5- and 1,6-hexa-methylenediamine, phenylenediamines, 2,3-, 2,4- and 2,6-tolylenediamine and 4,4'-, 2,4'- and 2,2'-diaminodiphenyl-methane.

Other suitable initiator molecules are: alkanolamines such as ethanolamine, N-methylethanolamine and N-ethylethanolamine, dialkanolamines, such as diethanolamine, N-methyldiethanol-amine and N-ethyldiethanolamine, and trialkanolamines, such as triethanolamine, and ammonia. Preference is given to using polyhydric, in particular dihydric and/or trihydric alcohols such as ethanediol, 1,2- and 1,3-propanediol, diethylene glycol, dipropylene glycol, butanediol-1,4, hexanediol-1,6, glycerol, trimethylolpropane, pentaerythritol, sorbitol und sucrose.

Preference is given to using, particularly for the preparation of rigid polyurethane foams, sucrose polyetherols, sorbitol polyetherols and glycol polyetherols.

The polyether polyols have a functionality of preferably from 2 to 6 and in particular from 2 to 4 and molecular weights of from 300 to 3000, preferably from 300 to 2000 and in particular from 400 to 2000.

Other suitable polyether polyols are polymer-modified polyether polyols, preferably graft polyether polyols, in particular those based on styrene and/or acrylonitrile which are prepared by in situ polymerization of acrylonitrile, styrene or preferably mixtures of sytrene and acrylonitrile, e.g. in a weight ratio of from 90:10 to 10:90, preferably from 70:30 to 30:70, advantageously in the abovementioned polyether polyols using a method similar to those described in the German Patents 11 11 394, 12 22 669 (U.S. Pat. Nos. 3,304,273, 3,383,351, 3,523,093), 11 52 536 (GB 10 40 452) and 11 52 537 (GB 987 618), and also polyether polyol dispersions which comprise as disperse phase, usually in an amount of from 1 to 50% by weight, preferably from 2 to 25% by weight: e.g. polyureas, polyhydrazides, polyurethanes containing bonded tertiary amino groups and/or melamine and are described, for example, in EP-B-011 752 (U.S. Pat. No. 4,304,708), U.S. Pat. No. 4,374,209 and DE-A-32 31 497.

The polyether polyols can be used individually or in the form of mixtures. They can also be mixed with the graft polyether polyols or polyester polyols and the hydroxyl-containing polyesteramides, polyacetals, polycarbonates and/or polyetherpolyamines.

Suitable polyester polyols can be prepared, for example, from organic dicarboxylic acids having from 2 to 12 carbon atoms, preferably aliphatic dicarboxylic acids having from 4 to 6 carbon atoms, and polyhydric alcohols, preferably diols, having from 2 to 12 carbon atoms, preferably from 2 to 6 carbon atoms. Examples of suitable dicarboxylic acids are: succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids can be used either individually or in admixture with one another. In place of the free dicarboxylic acids, it is also possible to use the corresponding dicarboxylic acid derivatives such as dicarboxylic esters of alcohols having from 1 to 4 carbon atoms or dicarboxylic anhydrides. Preference is given to using dicarboxylic acid mixtures of succinic, glutaric and adipic acid in weight ratios of, for example, 20–35: 3–50: 20–32 parts by weight, and in particular adipic acid. Examples of dihydric and polyhydric alcohols, in particular diols, are: ethanediol, diethyleneglycol, 1,2- or 1,3-propanediol, dipropylene glycol, 1,4-butanediol, 1,5-pentanediol, 1,6-hexanediol, 1,10-decanediol, glycerol and trimethylolpropane. Preference is given to using ethanediol, diethylene glycol, 1,4-butanediol, 1,5-pentane-diol, 1,6-hexanediol or mixtures of at least two of the diols mentioned, in particular mixtures of 1,4-butanediol, 1,5-pentanediol and 1,6-hexanediol. It is also possible to use polyester polyols derived from lactones, e.g. ε-capro-lactone or hydroxycarboxylic acids, e.g. ω-hydroxycaproic acid.

To prepare the polyester polyols, the organic, e.g. aromatic and preferably aliphatic, polycarboxylic acids and/or derivatives and polyhydric alcohols can be polycondensed in the absence of catalysts or preferably in the presence of esterification catalysts, advantageously in an atmosphere of inert gas such as nitrogen, carbon monoxide, helium, argon, etc., in the melt at from 150 to 250° C., preferably from 180 to 220° C., at atmospheric pressure or under reduced pressure to the desired acid number which is advantageously less than 10, preferably less than 2. In a preferred embodiment, the esterification mixture is polycondensed at the abovementioned temperatures to an acid number of from 80 to 30, preferably from 40 to 30, under atmospheric pressure and subsequently under a pressure of less than 500 mbar, preferably from 50 to 150 mbar. Suitable esterification catalysts are, for example, iron, cadmium, cobalt, lead, zinc, antimony, magnesium, titanium and tin catalysts in the form of metals, metal oxides or metal salts. However, the polycondensation can also be carried out in the liquid phase in the presence of diluents and/or entrainers such as benzene, toluene, xylene or chlorobenzene to azeotropically distil off the water of condensation.

To prepare the polyester polyols, the organic polycarboxylic acids and/or derivatives and polyhydric alcohols are advantageously polycondensed in a molar ratio of 1:1–1.8, preferably 1:1.05–1.2.

The polyester polyols obtained preferably have a functionality of from 2 to 4, in particular from 2 to 3, and a molecular weight of from 480 to 3000, preferably from 600 to 2000 and in particular from 600 to 1500.

The polyester polyols can be used individually or in the form of mixtures. They can also, like the polyether polyols, be mixed with the further H-functional compounds indicated below.

Suitable hydroxyl-containing polyacetals are, for example, the compounds which can be prepared from glycols such as diethylene glycol, triethylene glycol, 4,4'-dihydroxyethoxy-biphenyldimethylmethane, or hexanediol and formaldehyde. Suitable polyacetals can also be prepared by polymerization of cyclic acetals.

Suitable hydroxyl-containing polycarbonates are those of the type known per se, which can be prepared, for example, by reacting diols such as 1,3-propanediol, 1,4-butanediol and/or 1,6-hexanediol, diethylene glycol, triethylene glycol or tetraethylene glycol with diaryl carbonates, e.g. diphenyl carbonate, or phosgene.

The polyester amides include, for example, the predominantly linear condensates obtained from polybasic, saturated and/or unsaturated carboxylic acids or their anhydrides and polyfunctional saturated and/or unsaturated aminoalcohols or mixtures of polyfunctional alcohols and aminoalcohols and/or polyamines.

Suitable polyetherpolyamines can be prepared from the abovementioned polyether polyols by known methods. Examples which may be mentioned are the cyanoalkylation of polyoxyalkylene polyols and subsequent hydrogenation of the nitrile formed (U.S. Pat. No. 3,267,050) or the partial or complete amination of polyoxyalkylene polyols with amines or ammonia in the presence of hydrogen and catalysts (DE 12 15 373).

The polyurethanes, in particular rigid polyurethane foams, can be prepared with or without concomitant use of chain extenders and/or crosslinkers (c). However, the addition of chain extenders, crosslinkers or, if desired, mixtures thereof can prove to be advantageous for modifying the mechanical properties, e.g. the hardness. Chain extenders and/or crosslinkers used are diols and/or triols having molecular weights of less than 400, preferably from 60 to 300. Suitable chain extenders/crosslinkers are, for example, aliphatic, cycloaliphatic and/or araliphatic diols having from 2 to 14, preferably from 4 to 10, carbon atoms, for example ethylene glycol, 1,3-propanediol, 1,10-decanediol, o-, m- or p-dihydroxycyclohexane, diethylene glycol, dipropylene glycol and preferably 1,4-butanediol, 1,6-hexanediol and bis(2-hydroxyethyl)hydroquinone, triols, such as 1,2,4- or 1,3,5-trihydroxycyclohexane, glycerol and trimethylolpropane and low molecular weight hydroxyl-containing polyalkylene oxides based on ethylene oxide and/or 1,2-propylene oxide and the abovementioned diols and/or triols as initiator molecules.

If chain extenders, crosslinkers or mixtures thereof are employed for preparing the polyurethanes, these are advantageously used in an amount of from 0 to 20% by weight, preferably from 2 to 8% by weight, based on the weight of the component (b).

d) Blowing agents which are used, in particular, for preparing the rigid polyurethane foams preferably include water which reacts with isocyanate groups to form carbon dioxide, and/or physically acting blowing agents. Suitable physically acting blowing agents are liquids which are inert toward the organic, modified or unmodified polyisocyanates and have boiling points below 100° C., preferably below 50° C., in particular from −50° C. to 30° C., at atmospheric pressure, so that they vaporize under the action of the exothermic polyaddition reaction. Examples of such preferred liquids are alkanes, such as heptane, hexane, n- and iso-pentane, preferably industrial mixtures of n- and iso-pentanes, n- and iso-butane and propane, cycloalkanes such as cyclopentane and/or cyclohexane, ethers, such as furan, dimethyl ether and diethyl ether, ketones such as acetone and methyl ethyl ketone, alkyl carboxylates such as methyl formate, dimethyl oxalate and ethyl acetate and halogenated hydrocarbons such as methylene chloride, dichloromonofluoromethane, difluoro-methane, trifluoromethane, difluoroethane, tetrafluoro-methane, chlorodifluoroethanes, 1,1-dichloro-2,2,2-trifluoro-ethane, 2,2-dichloro-2-fluoroethane and heptafluoropropane. It is also possible to use mixtures of these low-boiling liquids with one another and/or with other substituted or unsubstituted hydrocarbons. Also suitable are organic carboxylic acids such as formic acid, acetic acid, oxalic acid, ricinoleic acid and carboxyl-containing compounds.

Preference is given to using water, chlorodifluoromethane, chlorodifluoroethanes dichlorofluoroethanes, pentane mixtures, cyclohexane and mixtures of at least two of these blowing agents, e.g. mixtures of water and cyclohexane, mixtures of chlorodifluoromethane and 1-chloro-2,2-difluoroethane and, if desired, water.

These blowing agents are usually added to the component (b). However, they can be added to the isocyanate component (a) or, as a combination, both to the component (b) and to the isocyanate component (a) or premixtures of these components with the other formative components.

The amount of blowing agent or blowing agent mixture used is from 1 to 25% by weight, preferably from 5 to 15% by weight, in each case based on the polyol component (b).

If water is used as blowing agent, it is preferably added to the formative component (b) in an amount of from 0.5 to 5% by weight, based on the formative component (b). The addition of water can also be carried out in combination with the use of the other blowing agents described.

e) Catalysts (e) used for preparing the polyurethanes are, in particular, compounds which strongly accelerate the reaction of the compounds containing reactive hydrogen atoms, in particular hydroxyl groups, of the component (b) and, if used, (c) with the organic, modified or unmodified polyisocyanates (a).

Use is advantageously made of basic polyurethane catalysts, for example tertiary amines such as triethylamine, tributyl-amine, dimethylbenzylamine, dicyclohexylmethylamine, dimethylcyclohexylamine, bis(N,N-dimethylaminoethyl) ether, bis(dimethylaminopropyl) urea, N-methylmorpholine or N-ethylmorpholine, N-cyclohexylmorpholine, N,N,N', N'-tetra-methylethylenediamine, N,N,N',N'-tetramethylbutanediamine, N,N,N',N'-tetramethylhexanediamine-1,6, pentamethyl-diethylenetriamine, dimethylpiperazine, N-dimethylamino-ethylpiperidine, 1,2-dimethylimidazole, 1-azabicyclo-[2.2.0]octane, 1,4-diazabicyclo[2.2.2]octane (Dabco) and alkanolamine compounds such as triethanolamine, triisopropanolamine, N-methyldiethanolamine and N-ethyldiethanolamine, dimethylaminoethanol, 2-(N,N-dimethylaminoethoxy)ethanol, N,N',N"-tris (dialkylaminoalkyl)hexahydrotriazines, e.g. N,N',N"-tris (dimethylaminopropyl)-s-hexahydrotriazine, and triethylenediamine. However, metal salts such as iron(II) chloride, zinc chloride, lead octoate and preferably tin salts such as tin dioctoate, tin diethylhexanoate and dibutyltin dilaurate and also, in particular, mixtures of tertiary amines and organic tin salts are also useful.

Other suitable catalysts are: amidines such as 2,3-dimethyl-3,4,5,6-tetrahydropyrimidine, tetraalkylammonium hydroxides, such as tetramethylammonium hydroxide, alkali metal hydroxides, such as sodium hydroxide and alkali metal alkoxides such as sodium methoxide and potassium isopro-poxide, and also alkali metal salts of long-chain fatty acids having from 10 to 20 carbon atoms and possibly lateral OH groups. Preference is given to using from 0.001 to 5% by weight, in particular from 0.05 to 2% by weight, of catalyst or catalyst combination, based on the weight of the component (b).

f) If desired, further auxilaries and/or additives (f) can also be incorporated into the reaction mixture for preparing the polyurethanes. Examples which may be mentioned are surface-active substances, foam stabilizers, cell regulators, fillers, dyes, pigments, flame retardants, hydrolysis inhibitors, fungistatic and bacteriostatic substances.

Suitable surface-active substances are, for example, compounds which serve to aid the homogenization of the starting materials and may also be suitable for regulating the cell structure of the plastics. Examples which may be mentioned are emulsifiers such as the sodium salts of castor oil sulfates or of fatty acids and also amine salts of fatty acids, e.g. diethylamine oleate, diethanolamine stearate, diethanolamine ricinoleate, salts of sulfonic acids, e.g. alkali metal or ammonium salts of dodecylbenzene- or dinaphthyl-methanedisulfonic acid and ricinoleic acid; foam stabilizers such as siloxane-oxyalkylene copolymers and other organopolysiloxanes ethoxylated alkylphenols, ethoxylated fatty alcohols, paraffin oils, castor oil or ricinoleic esters, Turkey red oil and peanut oil, and cell regulators such as paraffins, fatty alcohols and dimethylpolysiloxanes. The above-described oligomeric acrylates having polyoxyalkylene and fluoroalkane radicals as side groups are also useful for improving the emulsifying action, the cell structure and/or stabilizing the foam. The surface-active substances are usually employed in amounts of from 0.01 to 5% by weight, based on 100% by weight of the component (b).

For the purposes of the invention, fillers, in particular reinforcing fillers, are the customary organic and inorganic fillers, reinforcers, weighting agents, agents for improving the abrasion performance in paints, coating compositions, etc., known per se. Specific examples are: inorganic fillers such as siliceous minerals, for example sheet silicates such as antigorite, serpentine, hornblends, amphibols, chrysotile and talc, metal oxides such as kaolin, aluminum oxides, titanium oxides and iron oxides, metal salts such as chalk, barite and inorganic pigments such as cadmium sulfide and zinc sulfide, and also glass, etc. Preference is given to using kaolin (china clay), aluminum silicate and coprecipitates of barium sulfate and aluminum silicate and also natural and synthetic fibrous minerals such as wollastonite, metal and, in particular, glass fibers of various lengths which may be sized. Examples of suitable organic fillers are: carbon, melamine, rosin, cyclopentadienyl resins and graft polymers and also cellulose fibers, polyamide fibers, polyacrylonitrile fibers, polyurethane fibers, polyester fibers based on aromatic and/or aliphatic dicarboxylic esters and, in particular, carbon fibers.

The inorganic and organic fillers can be used individually or as mixtures and are advantageously incorporated into the reaction mixture in amounts of from 0.05 to 50% by weight, preferably from 1 to 40% by weight, based on the weight of the components (a) to (c), although the content of mats, nonwovens and woven fabrics of natural and synthetic fibers can reach values of up to 80% by weight.

Suitable flame retardants are, for example, tricresyl phosphate, tris(2-chloroethyl) phosphate, tris(2-chloropropyl) phosphate, tris(1,3-dichloropropyl) phosphate, tris(2,3-dibromopropyl) phosphate, tetrakis(2-chloroethyl)-ethylene diphosphate, dimethyl methanephosphonate, diethyl diethanolaminomethylphosphonate and also commercial halogen-containing flame-retardant polyols.

Apart from the halogen-substituted phosphates mentioned above, it is also possible to use inorganic or organic flame retardants such as red phosphorus, hydrated aluminum oxide hydrate, antimony trioxide, arsenic oxide, ammonium polyphosphate and calcium sulfate, expanded graphite or cyanuric acid derivatives such as melamine, or mixtures of at least two flame retardants, for example ammonium polyphosphate and melamine and also, if desired, maize starch or ammonium polyphosphate, melamine and expanded graphite and/or aromatic or aliphatic polyesters for making the polyisocyanate polyaddition products flame resistant. It has generally been found to be advantageous to use from 5 to 50% by weight, preferably from 5 to 25% by weight, of the flame retardants specified, based on the component (b).

Further details regarding the abovementioned other customary auxiliaries and additives may be found in the specialist literature, for example the monograph by J. H. Saunders and K. C. Frisch "High Polymers", Volume XVI, Polyurethanes, Parts 1 and 2, Interscience Publishers 1962 and 1964, or the Kunststoff-Handbuch, Polyurethane, Volume VII, Hanser-Verlag, Munich, Vienna, 1st, 2nd and 3rd editions, 1966, 1983 and 1993.

To prepare the polyurethanes of the present invention, the organic and/or modified organic diisocyanates and/or polyiso-cyanates (a), the polyether polyols to be used according to the present invention plus, if desired, further relatively high molecular weight compounds containing at least two reactive hydrogen atoms (b) and, if desired, chain extenders and/or crosslinkers (c) are reacted in such amounts that the equivalence ratio of NCO groups of the polyisocyanate (a) to the sum of the reactive hydrogen atoms of the components (b) and, if used, (c) is 0.85–1.25:1, preferably 0.95–1.15:1 and in particular 1–1.05:1. If the polyurethanes contain at least some bonded isocyanurate groups, a ratio of NCO groups of the polyisocyanates (a) to the sum of the reactive hydrogen atoms of the component (b) and, if used, (c) of 1.5–60:1, preferably 1.5–8:1, is usually employed.

The polyurethanes are advantageously prepared by the one-shot process, for example by means of the high-pressure or low-pressure technique, in open or closed molds, for example metal molds. Also customary is the continuous application of the reaction mixture to suitable belts for producing panels.

It has been found to be particularly advantageous to employ the two-component method and to combine the formative components (b), (d), (e) and, if used, (c) and (f) to form the component (A) and to use the organic and/or modified organic diisocyanates and/or polyisocyanates (a) or mixtures of the specified diisocyanates and/or polyisocyanates and, if desired, blowing agents (d) as component (B).

The formative components are mixed at from 15 to 90° C., preferably from 20 to 60° C. and in particular from 20 to 35° C., and introduced into the open mold or, if desired under increased pressure, into the closed mold or, in the case of a continuous workstation, applied to a belt which accommodates the reaction mixture. Mixing can, as already mentioned, be carried out mechanically by means of a stirrer or a stirring screw. The mold temperature is advantageously from 20 to 110° C., preferably from 30 to 60° C. and in particular from 45 to 50° C.

The process of the present invention has the advantage that the exact matching of the amines of the diphenylmethane series in combination with the further aromatic amines and the coinitiators produces polyether polyols having surprisingly low viscosities as homogeneous copolyetherols.

The low polyetherol viscosity makes possible optimum mechanical processing of the polyurethane systems produced therefrom. The step-wise molecular addition of alkylene oxide, commencing without catalyst or with only very small amounts of catalytically active substances, makes it possible to prepare amine polyetherols having extremely low contents of reactive primary and/or secondary amino groups and a molecular weight distribution which is optimum for the desired application. The polyetherols prepared have a sufficiently high mean functionality and, owing to the low intrinsic reactivity, allow optimum setting of the flowability and the curing both in injection and casting processes, and also in the double-belt technique using low-pressure or high-pressure machines.

The polyurethanes prepared have excellent mechanical and physical properties and are directly suitable for the abovementioned application areas.

The rigid polyurethane foams which are preferably prepared by the process of the present invention have a density of from 0.02 to 0.30 g/cm$^3$, preferably from 0.025 to 0.24 g/cm$^3$ and in particular from 0.03 to 0.1 g/cm$^3$. They are particularly suitable as insulation material in the building sector and the refrigeration appliance sector, e.g. as insulation boards, as intermediate layer for sandwich elements or for filling housings of refrigerators and chest freezers with foam. They can likewise be used for pipe insulation, as injection, filler and mounting foams and also as block foams.

The invention is illustrated by the examples below

EXAMPLE 1

Comparative Example

In a 1 l autoclave fitted with stirrer, metering-in facilities, heating and cooling and a facility for pressure measurement, 145 g of an isomer mixture of amines of the diphenylmethane series, consisting of 50.1 g of 2-ring amine, 45.4 g of 3-ring amine, 9.7 g of 4-ring amine and 39.8 g of amines having a higher number of rings, 80 g of diethylene glycol and 3.5 g of a 48% strength aqueous potassium hydroxide solution were blanketed with nitrogen and reacted with 510 g of propylene oxide at from 95 to 125° C. and a pressure decreasing from 5 to 1 bar, and subjected to an after-reaction at 110° C. for 1.5 hours.

The alkaline polyetherol was hydrolyzed with water and neutralized with phosphoric acid. It was subsequently distilled under reduced pressure and filtered.

The polyetherol obtained had the following properties:

| | |
|---|---|
| Hydroxyl number | 384 mg KOH/g |
| Viscosity at 25° C. | 18420 mPas |

EXAMPLE 2

According to the Present Invention

In an autoclave as described in Example 1, 152 g of the isomer mixture according to the present invention of amines of the diphenylmethane series, consisting of 64.7 g of 2-ring amine, 32.1 g of 3-ring amine, 15.8 g of 4-ring amine and 39.4 g of amines having a higher number of rings, with an addition of 0.0052% by weight of aniline and 0.0049% by weight of aminobenzylaniline, in each case based on the total weight of the abovementioned isomer mixture, 50 g of diethylene glycol and 3.5 g of a 48% strength aqueous potassium hydroxide solution were homogenized, blanketed with nitrogen and reacted with 200 g of propylene oxide to give a prepolymer having a hydroxyl number of 642 mg KOH/g.

Subsequently, 400 g of the prepolymer obtained were reacted with 300 g of propylene oxide and the product was stabilized at 110° C. for 1.5 hours. The alkaline polyetherol was hydrolyzed with water and neutralized with phosphoric acid. The product was then distilled under reduced pressure and filtered.

The product obtained had the following properties:

| | |
|---|---|
| Hydroxyl number | 381 mg KOH/g |
| Viscosity at 25° C. | 8840 mPas |

EXAMPLE 3

According to the Present Invention

In an autoclave as described in Example 1, 152 g of the isomer mixture according to the present invention of amines of the diphenylmethane series as described in Example 2, 20 g of diethylene glycol and 15 g of tolylenediamine were mixed, admixed with 0.5 g of 48% strength potassium hydroxide solution, blanketed with nitrogen and reacted with 150 g of propylene oxide.

This was followed by an after-reaction phase of 1 hour at 115° C. 3.2 g of 48% strength potassium hydroxide solution were added to the reaction mixture. A further 300 g of propylene oxide were subsequently metered in and the mixture was left for the after-reaction.

The alkaline polyetherol was hydrolyzed with water and neutralized with phosphoric acid. The product was then distilled under reduced pressure and filtered.

The following data were measured:

| | |
|---|---|
| Hydroxyl number | 391 mg KOH/g |
| Viscosity at 25° C. | 5370 mPas |

EXAMPLE 4

According to the Present Invention

In an autoclave as described in Example 1, 152 g of the isomer mixture according to the present invention of amines of the diphenylmethane series as described in Example 2, 20 g of diethylene glycol, 0.0075 g of aniline and 0.05 g of toluidine were mixed and reacted with 150 g of ethylene oxide.

This was followed by an after-reaction phase of 1 hour at 1150° C. 3.5 g of 48% strength potassium hydroxide solution were added to the reaction mixture. 300 g of propylene oxide were subsequently metered in and the mixture was left for the after-reaction. The alkaline polyetherol was hydrolyzed with water and neutralized with phosphoric acid. The product was then distilled under reduced pressure a nd filtered.

The following data were measured:

| | |
|---|---|
| Hydroxyl number | 407 mg KOH/g |
| Viscosity at 25° C. | 6420 mPas |

EXAMPLE 5

Comparative Example

The polyol component comprising 40 parts by weight of a polyol based on an isomer mixture of amines of the diphenylmethane series, diethylene glycol, propylene oxide, OH number 384 mg KOH/g, from Example 1, 23 parts by weight of a polyol based on sucrose, glycerol, propylene oxide, OH number 490 mg KOH/g, 16 parts by weight of a polyol based on sucrose, glycerol, propylene oxide, OH number 440 mg KOH/g, 5 parts by weight of a polyol based on propylene glycol, propylene oxide, OH number 250 mg KOH/g, 2 parts by weight of silicone stabilizer SR 321 (from OSi Specialties), 2 parts by weight of dimethylcyclohexylamine, 2 parts by weight of water and 10 parts by weight of cyclopentane, was intensively mixed with 125 parts by weight of raw MDI, NCO content 31.5% by mass, in a beaker having a volume of 1 l.

Using a universal testing machine, an indentor having a diameter of 20 mm was pressed into the foam after 3 minutes. The penetration depth was 10 mm (indentation test). This test is suitable for precisely determining the progress of the curing process at certain times.

A result of 12 N was found.

100 g of this mixture were, immediately after mixing the components, placed in a continuous hose made of plastic film and having a diameter of 4.5 cm. The hose was clamped off at one end and the foam length obtained in cm was taken as a measure of the flowability (hose test).

A result of 130 cm was found.

EXAMPLE 6

According to the Present Invention

A foam was prepared as in Example 5, but using 40 parts by weight of a polyol based on an isomer mixture of amines of the diphenyl-methane series, aniline, aminobenzylaniline, diethylene glycol, propylene oxide, OH number 381 mg KOH/g, from Example 2.

The indentation test gave a result of 17 N after 3 minutes and the hose test gave a result of 145 cm.

EXAMPLE 7

According to the Present Invention

A foam was prepared as in Example 5, but using 40 parts by weight of a polyol based on an isomer mixture of amines of the diphenylmethane series, tolylenediamine, diethylene glycol, propylene oxide, OH number 391 mg KOH/g, from Example 3.

The indentation test gave a result of a 18 N after 3 minutes and the hose test gave a result of 150 cm.

We claim:

1. A process for preparing polyurethanes having improved curing comprising reacting a) organic and/or modified organic diisocyanates and/or polyisocyanates with b) polyether polyols based on aromatic amines, prepared by reacting amine combinations and, optionally, further coinitiators other than aliphatic amine compounds, in a step-wise molecular addition of alkylene oxide, and also, optionally, further relatively high molecular weight compounds containing at least two reactive hydrogen atoms, and, optionally, c) chain extenders and/or crosslinkers in the presence of d) blowing agents consisting essentially of hydrocarbons and optionally water, e) catalysts and, optionally, f) further auxiliaries and/or additives, wherein the amine combination comprises, based on the weight of the amine composition, from 5 to 20 percent by weight of 4-ring amine, from 15 to 30 percent by weight of 3-ring amine, from 20 to 35 percent by weight of amines having more than 4 rings, and from 25 to 50 percent by weight of 2-ring amine, where the proportions add up to 100 percent by weight, in combination with further aromatic amines.

2. A process as claimed in claim 1, wherein the amine combination comprises from 5 to 15 percent by weight of 4-ring amine, from 15 to 25 percent by weight of 3-ring amine, from 20 to 30 percent by weight of amines having more than 4 rings and from 40 to 50 percent by weight of 2-ring amine, where the proportions add up to 100 percent by weight.

3. A process as claimed in claim 1, wherein said further aromatic amines are selected from the group consisting of aniline, aminobenzylaniline, toluidine, tolylenediamine and mixtures thereof.

4. A process as claimed in claim 3, wherein the further aromatic amines are used in an amount of from 0.01 to 20 percent by weight, based on the weight of the mixture of amines.

5. A process as claimed in claim 1, wherein the molecular addition of alkylene oxide is carried out in two or more stages using increasing amounts of catalyst in each stage, where the first stage is carried out without catalyst or using small amounts of catalyst of less than 0.05 percent by weight and the following stages are carried out using amounts of catalyst of from 0.05 to 0.5 percent by weight, in each case calculated as KOH in the finished polyether.

6. A process as claimed in claim 2, wherein the amine combination further comprises aromatic amines selected from the group consisting of aniline, aminobenzylaniline, toluidine, tolylenediamine and mixtures thereof.

7. A process as claimed in claim 6, wherein the further aromatic amines are used in an amount of from 0.01 to 20 percent by weight, based on the weight of the mixture of amines.

8. A process as claimed in claim 2, wherein the molecular addition of alkylene oxide is carried out in two or more stages using increasing amounts of catalyst in each stage, where the first stage is carried out without catalyst or using small amounts of catalyst of less than 0.05 percent by weight and the following stages are carried out using amounts of catalyst of from 0.05 to 0.5 percent by weight, in each case calculated as KOH in the finished polyether.

9. A process as claimed in claim 3, wherein the molecular addition of alkylene oxide is carried out in two or more stages using increasing amounts of catalyst in each stage, where the first stage is carried out without catalyst or using small amounts of catalyst of less than 0.05 percent by weight and the following stages are carried out using amounts of catalyst of from 0.05 to 0.5 percent by weight, in each case calculated as KOH in the finished polyether.

10. A process as claimed in claim 4, wherein the molecular addition of alkylene oxide is carried out in two or more stages using increasing amounts of catalyst in each stage, where the first stage is carried out without catalyst or using small amounts of catalyst of less than 0.05 percent by weight and the following stages are carried out using amounts of catalyst of from 0.05 to 0.5 percent by weight, in each case calculated as KOH in the finished polyether.

11. A process as claimed in claim 6, wherein the molecular addition of alkylene oxide is carried out in two or more stages using increasing amounts of catalyst in each stage, where the first stage is carried out without catalyst or using small amounts of catalyst of less than 0.05 percent by weight and the following stages are carried out using amounts of catalyst of from 0.05 to 0.5 percent by weight, in each case calculated as KOH in the finished polyether.

12. A process as claimed in claim 7, wherein the molecular addition of alkylene oxide is carried out in two or more stages using increasing amounts of catalyst in each stage, where the first stage is carried out without catalyst or using small amounts of catalyst of less than 0.05 percent by weight and the following stages are carried out using amounts of catalyst of from 0.05 to 0.5 percent by weight, in each case calculated as KOH in the finished polyether.

13. A polyurethane having improved curing properties comprising the reaction product of a) an organic and/or modified organic diisocyanate and/or polyisocyanate with b) an aromatic amine-initiated polyether polyol, prepared by reacting an amine combination, in a step-wise molecular addition with an alkylene oxide, and optionally, c) chain extend ers and/or crosslinkers in the presence of d) a blowing agent consisting essentially of hydrocarbons and optionally water, e) a catalyst and optionally, f) further auxiliaries and/or additives, wherein the amine combination comprises, based on the weight of the amine combination, from 5 to 15 percent by weight of 4-ring amines, from 15 to 25 percent by weight of 3-ring amines, from 20 to 30 percent by weight of amines having more than 4 rings, and from 40 to 50 percent by weight of 2-ring amines, wherein the proportions add up to 100 percent by weight, in combination with further aromatic amines.

14. A polyurethane as claimed in claim 13, wherein the amine combination further comprises aromatic amines selected from the group consisting of aniline, aminobenzylaniline, toluidine, tolylenediamine and mixtures thereof.

15. A polyurethane as claimed in claim 13, wherein the further aromatic amines are used in an amount of from 0.01 to 20 percent by weight, based on the weight of the mixture of amines.

16. A polyurethane as claimed in claim 13, wherein the molecular addition of alkylene oxide is carried out in two or more stages using increasing amounts of catalyst in each stage, where the first stage is carried out without catalyst or using small amounts of catalyst0 0 of less than 0.05 percent by weight and the following stages are carried out using amounts of catalyst of from 0.05 to 0.5 percent by weight, in each case calculated as KOH in the finished polyether.

17. A polyurethane having improved cured properties comprising the reaction product of a) an organic and/or modified organic diisocyanate and/or polyisocyanate with b) an aromatic amine-initiated polyether polyol, prepared by reacting an amine combination in a step-wise molecular addition with an alkylene oxide, and optionally, c) chain extenders and/or crosslinkers in the presence of
d) a blowing agent consisting essentially of hydrocarbons and optionally water,
e) a catalyst and optionally,
f) further auxiliaries and/or additives,
   wherein the amine combination comprises, based on the weight of the amine combination, from 5 to 15 percent by weight of 4-ring amines, from 15 to 25 percent by weight of 3-ring amines, from 20 to 30 percent by weight of amines having more than 4 rings, from 40 to 50 percent by weight of 2-ring amines, and from 0.01 to 20 percent by weight of further aromatic amines selected from the group consisting of aniline, aminobenzylaniline, toluidine, tolylenediamine and mixtures thereof, where the proportions of said amine combination add up to 100 percent by weight.

* * * * *